(12) United States Patent
Wong et al.

(10) Patent No.: US 12,543,189 B2
(45) Date of Patent: Feb. 3, 2026

(54) METHODS, INFRASTRUCTURE EQUIPMENT AND COMMUNICATIONS DEVICE

(71) Applicant: Sony Group Corporation, Tokyo (JP)

(72) Inventors: Shin Horng Wong, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/646,829

(22) Filed: Apr. 26, 2024

(65) Prior Publication Data

US 2024/0276512 A1 Aug. 15, 2024

Related U.S. Application Data

(63) Continuation of application No. 17/873,183, filed on Jul. 26, 2022, now Pat. No. 12,058,695, which is a (Continued)

(30) Foreign Application Priority Data

Sep. 29, 2017 (EP) .................................... 17194261

(51) Int. Cl.
*H04L 5/00* (2006.01)
*H04W 72/23* (2023.01)
*H04W 72/0446* (2023.01)

(52) U.S. Cl.
CPC ........... *H04W 72/23* (2023.01); *H04L 5/0007* (2013.01); *H04W 72/0446* (2013.01)

(58) Field of Classification Search
CPC .. H04W 72/23; H04W 72/0446; H04L 5/0007
See application file for complete search history.

(56) References Cited

U.S. PATENT DOCUMENTS

2007/0237254 A1 10/2007 Pi
2010/0296410 A1 11/2010 Kazmi et al.
(Continued)

FOREIGN PATENT DOCUMENTS

EP 2518936 A2 10/2012

OTHER PUBLICATIONS

International Search Report and Written Opinion mailed on Nov. 14, 2018 for PCT/EP2018/072137 filed on Aug. 15, 2018, 12 pages.
(Continued)

*Primary Examiner* — Andrew Lee
(74) *Attorney, Agent, or Firm* — XSENSUS LLP

(57) ABSTRACT

A method comprises receiving from an infrastructure equipment of wireless communications network slot configuration information indicating a configuration of one or more slots of a wireless access interface provided by a wireless communications network for communicating data to the communications device in the downlink and receiving data from the communications device in the uplink, the time divided slots of the wireless access interface each providing a plurality of symbols on one of more radio frequency carrier signals which can be configured differently for use by the communications device or the infrastructure equipment, the slot configuration information including an indication that one or more of the plurality of symbols are to be used for transmitting signals from the communications device or that one or more of the plurality of symbols are to be used for receiving signals at the communications device.

20 Claims, 8 Drawing Sheets

Related U.S. Application Data continuation of application No. 16/646,149, filed as application No. PCT/EP2018/072137 on Aug. 15, 2018, now Pat. No. 11,419,102.

(56) References Cited

U.S. PATENT DOCUMENTS

| | | | |
|---|---|---|---|
| 2011/0268006 | A1 | 11/2011 | Koskela et al. |
| 2012/0287770 | A1 | 11/2012 | Iwai et al. |
| 2014/0177485 | A1 | 6/2014 | Wang et al. |
| 2015/0163027 | A1 | 6/2015 | Lee et al. |
| 2017/0064729 | A1 | 3/2017 | Sadek et al. |
| 2018/0083758 | A1* | 3/2018 | Islam .................. H04L 27/2602 |
| 2018/0288746 | A1* | 10/2018 | Zhang .................. H04W 72/23 |
| 2019/0059084 | A1 | 2/2019 | Lee et al. |
| 2020/0007300 | A1 | 1/2020 | Wang et al. |
| 2020/0177341 | A1 | 6/2020 | Li et al. |
| 2020/0177424 | A1 | 6/2020 | Noh et al. |
| 2020/0187236 | A1* | 6/2020 | Moon ........................ H04L 1/00 |
| 2020/0214006 | A1* | 7/2020 | Choi ..................... H04L 5/0053 |
| 2021/0168807 | A1 | 6/2021 | Jung et al. |
| 2021/0211343 | A1 | 7/2021 | Baldemair et al. |

OTHER PUBLICATIONS

3GPP, "5G; Evolved Universal Terrestrial Radio Access (E-UTRA); User Equipment (UE) procedures in idle mode," 3GPP Technical Specification 36.304, version 15.4.0, Release 15, Jun. 25, 2019, pp. 1-55.

3GPP, "5G; Evolved Universal Terrestrial Radio Access (E-UTRA); Medium Access Control (MAC) protocol specification," 3GPP Ts 36.321, version 15.6.0, Release 15, Jun. 2019, pp. 1-133.

Ericsson and Qualcomm, "New WID on Even further enhanced MTC for LTE," 3GPP TSG RAN Meeting #75, RP-170732, revision of RP-170465, Dubrovnik, Croatia, Mar. 6-9, 2017, 4 pages.

Ericsson, "Revised WID for Further Enhanced MTC for LTE," 3GPP TSG RAN Meeting #73, RP-161464, revision of RP-161321, New Orleans, USA, Sep. 19-22, 2016, 6 pages.

Holma, H., and Toskala, A., "LTE for UMTS—OFDMA and SC-FDMA Based Radio Access," John Wiley and Sons, Apr. 2009, 8 pages.

Holma, H., and Toskala, A., "LTE for UMTS—OFDMA and SC-FDMA Based Radio Access," John Wiley and Sons, Apr. 2009, pp. 25-27.

Huawei and Hisilicon, "Revised work item proposal: Enhancements of NB-IoT," 3GPP TSG RAN Meeting #73, RP-161901, revision of RP-161324, New Orleans, USA, Sep. 19-22, 2016, 8 pages.

Huawei et al., "New WID on Further NB-IoT enhancements," #3GPP TSG RAN Meeting #75, RP-170852, Dubrovnik, Croatia, Mar. 6-9, 2017, 6 pages.

NTT Docomo, "New SID Proposal: Study on New Radio Access Technology," 3GPP TSG RAN Meeting #71, RP-160671, Göteborg, Sweden, Mar. 7-10, 2016, 8 pages.

Nokia and Nokia Shanghai Bell, "On the UE behaviour related to group-common PDCCH in NR," 3GPP TSG-RAN WG1#90, R1-1714064, Prague, Czech Republic, Aug. 21-25, 2017, 5 pages.

NTT Docomo, Inc., "New WID on New Radio Access Technology," 3GPP TSG RAN Meeting #75, RP-170847, Dubrovnik, Croatia, Mar. 6-9, 2017, 8 pages.

Guangdong Oppo Mobile Telecom, "Resource allocation for PDSCH/PUSCH", 3GPP TSG RAN WG1 Meeting NR#3, Nagoya, Japan, 18-21, Sep. 2017, R1-1715690, XP051339152, pp. 1-13.

MCC Support, "Final Report of 3GPP TSG RAN WG1 #89 v1.0.0 (Hangzhou, China, May 15-19, 2017)", 3GPP TSG RAN WG1 Meeting #90, Praque, Czech Rep, Aug. 21-25, 2017, R1-1712031, XP051328122, pp. 1-164.

Panasonic, "DL/UL resource allocation", 3GPP TSG RAN WG1 Meeting NR#3, Nagoya, Japan, Sep. 18-21, 2017, RI-1715779, pp. 1-8, XP051339239.

3GPP TS 36.304 v14.2.0 (Mar. 2017), 3rd Generation Partnership Proect; Technical Specification Group Radio Access Network; Evolved Universal Terrestrial Radio Access (E-UTRA); User Equipment (UE) procedures in idle mode (Release 14), pp. 1-49.

3GPP TS 36.321 v13.5.0 (Mar. 2017), 3rd Generation Partnership Proect; Technical Specification Group Radio Access Network; Evolved Universal Terrestrial Radio Access (E-UTRA); Medium Access Control (MAC) protocol specification (Release 13), pp. 1-93.

\* cited by examiner

Cannot be overwritten by DCI

METHODS, INFRASTRUCTURE EQUIPMENT AND COMMUNICATIONS DEVICE

CROSS-REFERENCE TO RELATED APPLICATIONS

The present application is a continuation of U.S. application Ser. No. 17/873,183, filed on Jul. 26, 2022, which is a continuation of U.S. application Ser. No. 16/646,149, filed on Mar. 11, 2020 (now U.S. Pat. No. 11,419,102), which is based on PCT filing PCT/EP2018/072137, filed Aug. 15, 2018, which claims priority to European patent application no. 17194261.8, filed on Sep. 29, 2017, the entire contents of each are incorporated herein by reference.

BACKGROUND

Field of Disclosure

The present disclosure relates to infrastructure equipment and communications devices of communications systems, where multiple methods may be used to configured slot structures of transmissions between the infrastructure equipment and communications devices.

The present application claims the Paris Convention priority of European patent application EP17194261.8, the contents of which are hereby incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

The increasing use of different types of terminal devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above.

Embodiments of the present technique can provide a method of transmitting or receiving signals by a communications device communicating under control of a wireless communications network. The method comprises receiving from an infrastructure equipment of the wireless communications network slot configuration information indicating a configuration of one or more time divided slots of a wireless access interface provided by the wireless communications network for communicating data to the communications device in a downlink and receiving data from the communications device in an uplink, the time divided slots of the wireless access interface each providing a plurality of symbols on one of more radio frequency carrier signals which can be configured differently for use by the communications device or the infrastructure equipment. The symbols may be for example Orthogonal Frequency Division Multiplexed (OFDM) symbols comprising a plurality of sub-carriers arranged in the frequency domain, each sub-carrier in a symbol being provided as a resource element of the wireless access interface. The slot configuration information includes an indication that one or more of the plurality of symbols are to be used for transmitting signals from the communications device or that one or more of the plurality of symbols are to be used for receiving signals at the communications device. The method includes, in accordance with the received slot configuration information receiving signals by the communications device in each of the one or more slots on the one or more of the symbols allocated for receiving signals, and transmitting signals from the communications device in each of the one or more slots on the one or more of the symbols allocated to the communications device for transmitting signals. The receiving the slot configuration information from the infrastructure equipment comprises receiving first slot configuration information from the infrastructure equipment indicating the configuration of a first plurality of the time slots, and receiving subsequently at least one other slot configuration information from the infrastructure equipment indicating the configuration of one or more of the first plurality of time slots. If the at least one other slot configuration information indicates that one or more of the symbols of each of the one or more time slots are configured differently to the first slot configuration information, the method comprises determining a dynamic characteristic of the first slot information and the at least one other slot information, and determining a configuration of the differently configured one or more symbols by the communications device according to a conflict resolution rule based on the determined dynamic characteristic of the first slot configuration information and the determined dynamic characteristic of the at least one other slot configuration information. The dynamic characteristic may be for example one or both of a rate of change of the slot configuration information or a time duration over which the slot configuration information is valid.

Embodiments of the present technique can provide an arrangement in which a communications device is configured to determine autonomously, according to a conflict resolution rule how to configure one or more symbols, which may be OFDM symbols of one or more time slots where different slot configuration information received at different times indicate a different configuration of the one or more symbols. The conflict resolution rule may be pre-determined according to a system configuration so that an infrastructure equipment from which the slot configuration information was sent can also determine the way in which the communications device will configure the one or more symbols which have received conflicting configurations. The communications device can therefore be configured with one or more symbols with conflicting configurations as either for uplink (UL), downlink (DL), reserved or for sidelink (device to device) communications.

Respective aspects and features of the present disclosure are defined in the appended claims.

In [5], it is proposed that symbols with conflicting DL-UL configurations are treated as errors and that the link direction is unknown to the UE. It should be noted that although [5] stated an unknown direction, it does not state that it can be overwritten by a more dynamic indicator such as a DCI.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
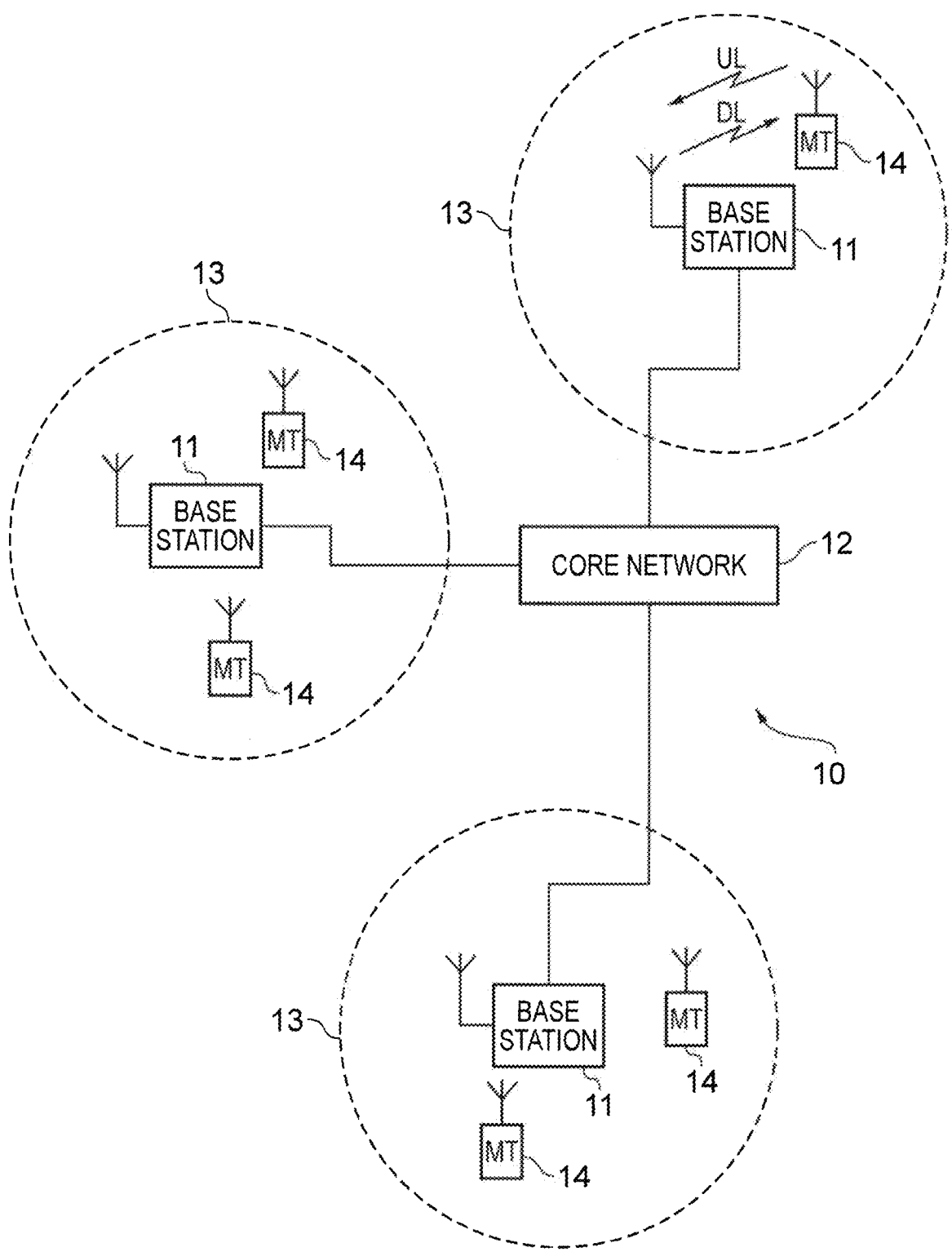
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [6]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink. Data is transmitted from terminal devices 14 to the base stations 11 via a radio uplink. The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/ nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
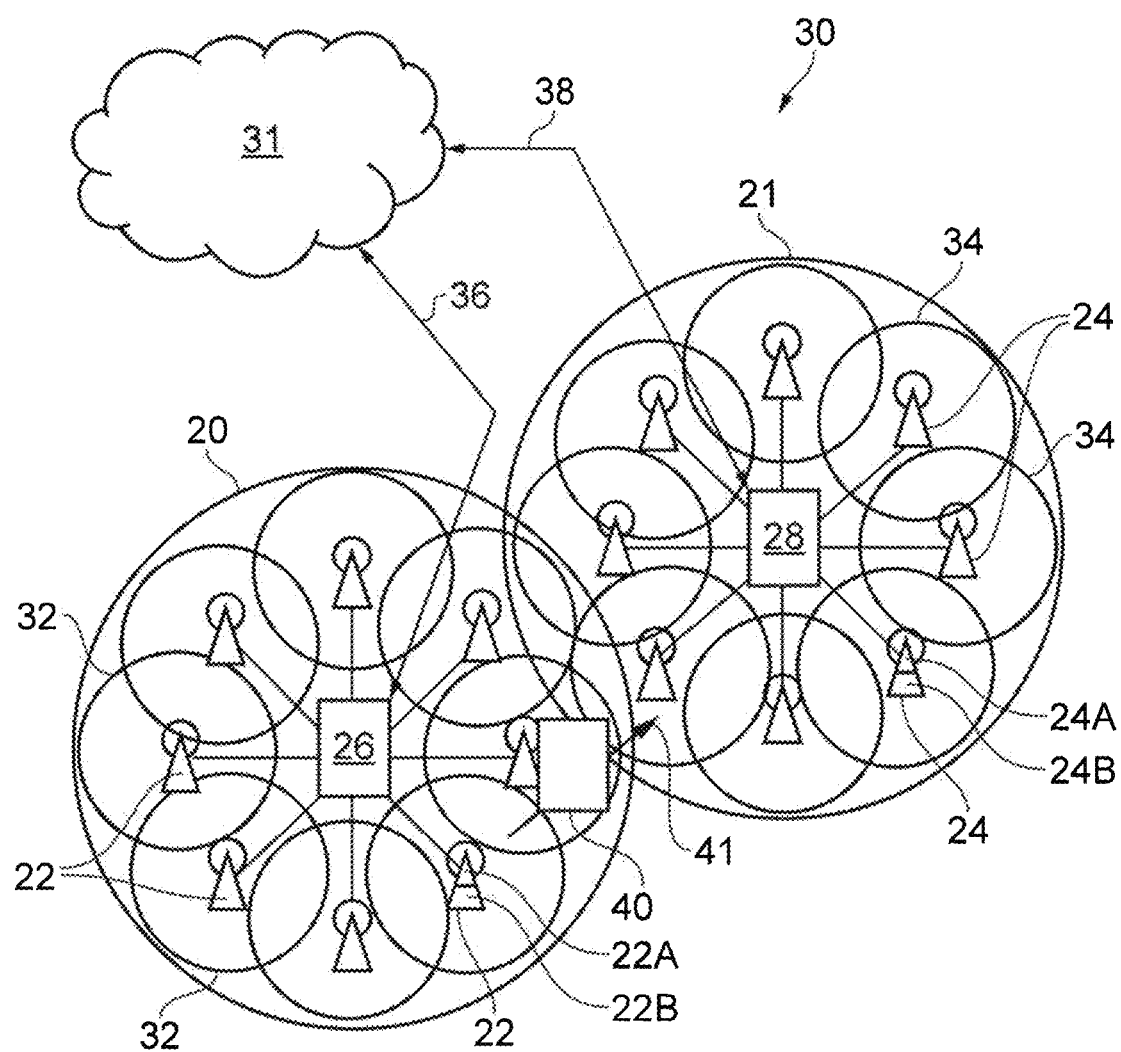
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/ remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/ TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating. In such cases, as far as the terminal device is concerned, it simply transmits uplink data to the controlling node 26 and receives downlink data from the controlling node 26 and the terminal device has no awareness of the involvement of the distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense of not being able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station.

For a terminal device in RRC idle mode the core network is aware that the terminal device is present within the network, but the radio access network (RAN) part (comprising radio network infrastructure equipment such as the base stations 11 of FIG. 1 and/or the combined TRPs/CUs of FIG. 2) is not. The core network is aware of the location of idle mode terminal devices at a paging tracking area level but not at the level of individual transceiver entities. The core network will generally assume a terminal device is located within the tracking area(s) associated with a transceiver entity most recently used for communicating with the terminal device, unless the terminal device has since provided a specific tracking area update (TAU) to the network. (As is conventional, idle mode terminal devices are typically required to send a TAU when they detect they have entered a different tracking area to allow the core network to keep track of their location.) Because the core network tracks terminal devices at a tracking area level, it is generally not possible for the network infrastructure to know which specific transceiver entities (radio network node) to use when seeking to initiate contact with a terminal device in idle mode. Consequently, and as is well known, when a core network is required to connect to an idle mode terminal device a paging procedure is used.

In a typical currently deployed network, idle mode terminal devices are configured to monitor for paging messages periodically. For terminal devices operating in a discontinuous reception (DRX) mode this occurs when they wake up for their DRX awake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network.

NR Slot Format Configuration

A 3GPP Study Item (SI) on New Radio Access Technology (NR) [9] has been completed and a Work Item (WI) has been agreed to specify functionalities for NR[10] which, as described above, would be the new Radio Access Technology (RAT) for the next generation wireless communication system, i.e. 5G. The new RAT is expected to operate in a large range of frequencies, from hundreds of MHz to 100 GHz and it is expected to cover a broad range of use cases.

In NR, a slot consists of multiple OFDM symbols, e.g. 14 symbols where a transmission of a physical channel can occur over one or more slots. In a time division duplexed (TDD) system, the symbols within a slot can also be configured to operate in the uplink (UL) or downlink (DL) direction. Currently in 3GPP, the slot structure can be configured using 3 different methods, i.e.:

Semi-static configuration using RRC signalling,
Dynamically using a Slot Format Indicator (SFI) carried by a Group Common PDCCH, or
Dynamically using a UE specific DCI.

Figure 3:
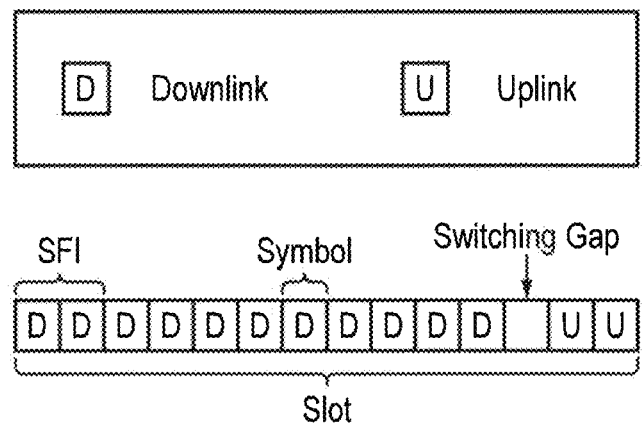
FIG. 3 illustrates an example of a Slot Format Indicator (SFI) indicating downlink and uplink configuration of multiple OFDM symbols in a New Radio slot.

The Slot Format Indicator (SFI) carries information relating to the structure of one or multiple slots and is carried by a Group Common PDCCH, where the SFI is transmitted to a group of UEs configured to monitor this Group Common PDCCH. One of the components of the slot structure information carried by the SFI is the DL & UL symbol configuration in a slot (or multiple slots). That is an indication of which symbols in a slot or multiple slots are for downlink or uplink transmissions. An example is shown in FIG. 3, where the Group Common PDCCH carrying the SFI is transmitted in the first 2 symbols of the slot and it indicates that the $3^{rd}$ till the $11^{th}$ symbols are used for downlink transmission and the $13^{th}$ and $14^{th}$ symbols are for uplink transmission. The $12^{th}$ is a gap between the downlink and uplink symbols for switching between DL and UL. This could be used for a PDSCH transmission in the DL ($3^{rd}$ till $11^{th}$ symbols) followed by an acknowledgement in the uplink in the last two symbols.

In addition to DL and UL symbols, the symbol can also be configured as "Unknown" or "Reserved." An "Unknown" symbol means that the symbol is flexible and can be overwritten by the UE specific DCI. That is a symbol can be configured as "Unknown" semi-statically or by the SFI and can be overwritten as a DL or an UL by the UE specific DCI. A "Reserved" symbol is not used and cannot be overwritten. Currently in 3GPP the "Reserved" symbol is at least semi-statically configured (3GPP may decide later whether it can also be configured by the SFI).

Figure 4:
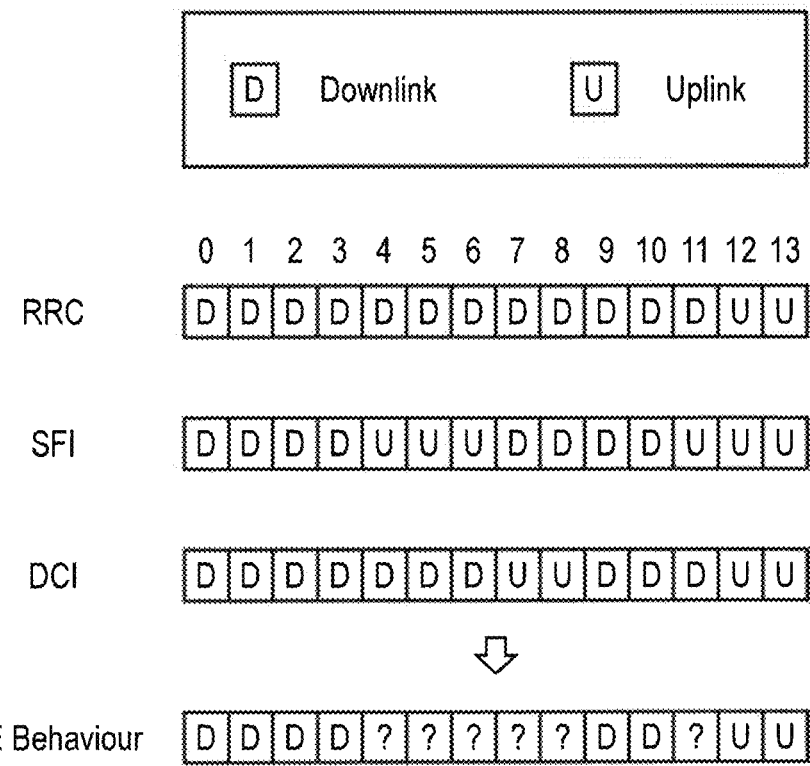
FIG. 4 illustrates an example of a conflict between multiple methods used to configure a New Radio slot.

It can be appreciated that having multiple methods to configure the same slot can lead to conflict in configurations. For example in FIG. 4, the RRC, SFI and DCI configures a DL-UL structure such that symbol 4, 5, 6, 7, 8 and 11 are inconsistent and leading to ambiguous UE behaviour. Hence, a method is required to resolve such conflicting configurations.

NR Slot Format Configuration Conflicts

Embodiments of the present technique provide methods and apparatus which are operable to interpret symbols with conflicting configuration as flexible symbols. That is, such symbols can be overwritten by a dynamic configuration such as UE specific DCI to be either DL or UL.

Figure 5:
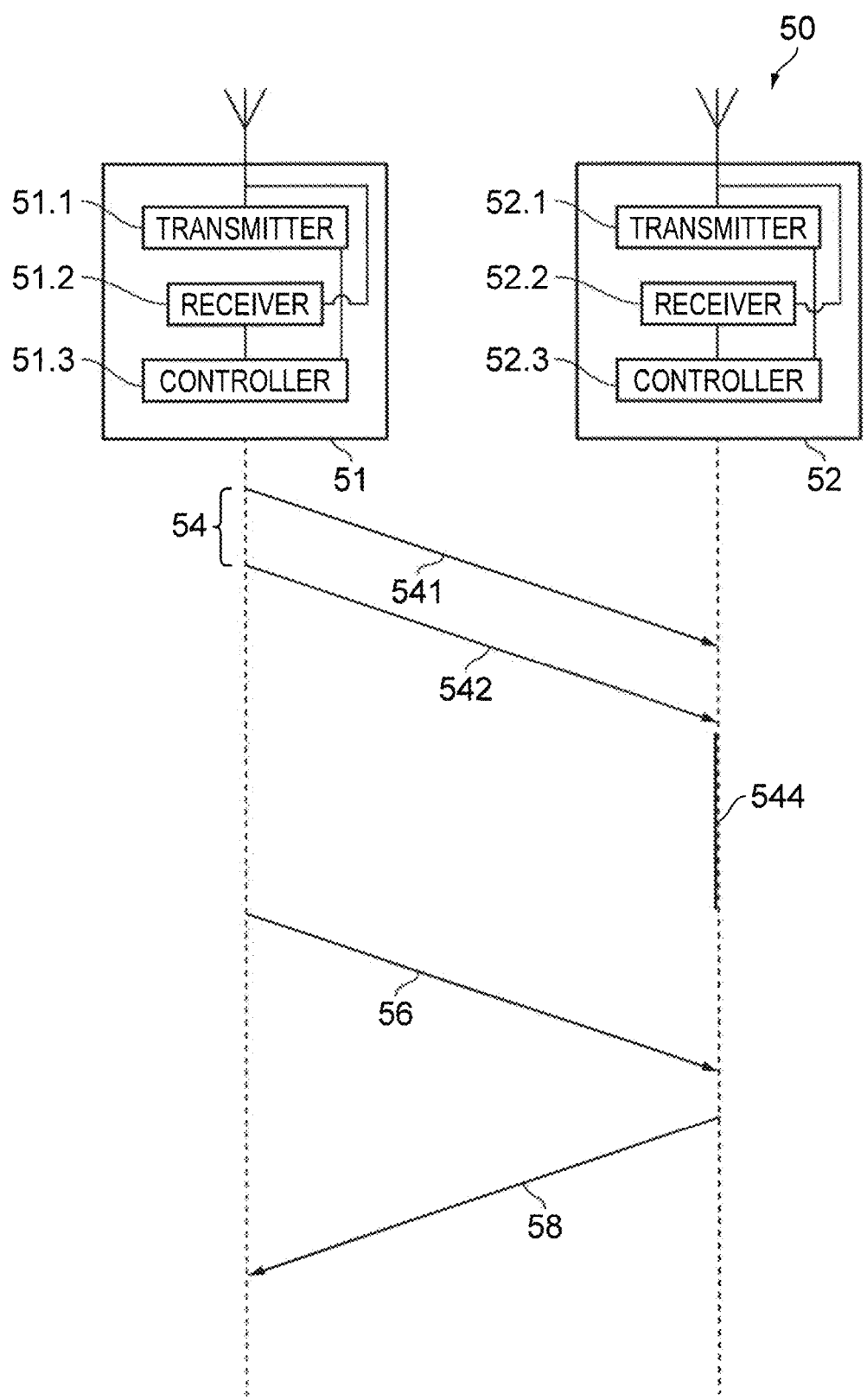
FIG. 5 shows a part schematic, part message flow diagram representation of a communications system in accordance with embodiments of the present technique.

FIG. 5 shows a part schematic, part message flow diagram representation of a communications system 50 in accordance with embodiments of the present technique. The communications system 50 comprises an infrastructure equipment 51 of a wireless communications network and a communications device 52. Each of the infrastructure equipment 51 and communications device 52 comprise a transmitter (or transmitter circuitry) 51.1, 52.1, a receiver (or receiver circuitry) 51.2, 52.2 and a controller (or controller circuitry) 53.1, 53.2. Each of the controllers 53.1, 53.2 may be, for example, a microprocessor, a CPU, or a dedicated chipset, etc. It will be appreciated by those skilled in the art that, in arrangements of the present technique, the communications device 52 may not always include a transmitter 52.1, for example in scenarios where the communications device 52 is a low-power wearable device.

As shown in FIG. 5, the communications device 52 is configured to receive 54 from the infrastructure equipment 51 of the wireless communications network slot configuration information indicating a configuration of one or more slots of a wireless access interface provided by the wireless communications network for communicating data to the communications device 52 on a downlink and receiving data from the communications device 52 on an uplink, the time divided slots of the wireless access interface each providing a plurality of symbols on one of more radio frequency carrier signals which can be configured differently for use by the communications device 52 or the infrastructure equipment 51, the slot configuration information including an indication that one or more of the plurality of symbols are to be used for transmitting signals from the communications device 52 or that one or more of the plurality of symbols are to be used for receiving signals at the communications device 52, and in accordance with the received slot configuration information, to receive 56 signals by the communications device 52 in each of the one or more slots on the one or more of the symbols allocated from receiving signals, and to transmit 58 signals from the communications device in each of the one or more slots on the one or more of the symbols allocated to the communications device for transmitting signals. During the step of receiving the slot configuration information 54 from the infrastructure equipment 51, the communications device 52 is configured to receive 541 first slot configuration information from the infrastructure equipment 51 indicating the configuration of a first plurality of the time slots, and to receive 542 subsequently at least one other slot configuration information from the infrastructure equipment 51 indicating the configuration of one or more of the first plurality of time slots, and if the at least one other slot configuration information indicates that one or more of the symbols of each of the one or more time slots are configured differently to the first slot configuration information, determining 544 a dynamic characteristic of the first slot information and the at least one other slot information, and determining 544 a configuration of the differently configured one or more symbols by the communications device 52 according to a conflict resolution rule based on the determined dynamic characteristic of the first slot configuration information and the determined dynamic characteristic of the at least one other slot configuration information.

In one example, the dynamic characteristic may be for example one or both of a rate of change of the slot configuration information, or a persistence rate of the slot configuration information or a time duration over which the slot configuration information is valid.

In some embodiments of the present technique, the determining the configuration of the differently configured one or more symbols by the communications device according to a conflict resolution rule comprises identifying the one or more symbols of each of the one or more time slots which are configured differently between the first slot configuration information and the at least one other slot configuration information, and if the dynamic characteristic is for example a rate of change of the first slot configuration information is less than the rate of change of the at least one other slot configuration information, determining the configuration of the one or more symbols according to the at least one other slot configuration information in preference to the first slot configuration information, else determining the configuration of the one or more symbols according to the first slot configuration information in preference to the at least one other slot configuration information.

Figure 6:
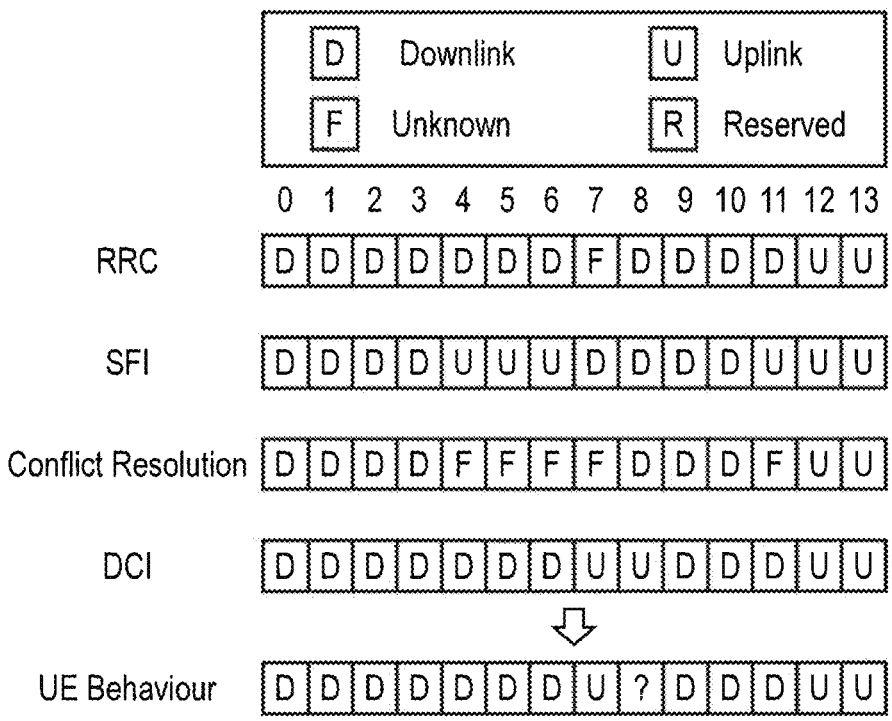
FIG. 6 illustrates an example of a first method of resolving a conflict between multiple methods used to configure a New Radio slot in accordance with embodiments of the present technique.

According to these example embodiments of the present technique, a more dynamic configuration method can overwrite a less dynamic configuration. In embodiments of the present technique, the least dynamic configuration is the RRC configuration and the most dynamic configuration is the UE specific DCI. The SFI is more dynamic than that of the RRC configuration and less dynamic than that of the UE specific DCI. In these embodiments, only conflicts between the RRC configuration and the SFI can be treated as flexible symbols. That is, any conflicting configuration between RRC and SFI would turn that symbol into an "Unknown" configuration, which can be overwritten by the UE specific DCI. An example is shown in FIG. 6, with symbols 4, 5, 6, 7 & 11 having conflicting configuration between RRC and SFI. As per the embodiment, these conflicts are resolved by turning these symbols as flexible or "Unknown" symbols. These symbols can therefore be overwritten by the most dynamic configuration, such as the UE specific DCI, that is, the DCI will indicate the final configuration for these symbols. However, symbol 8 in this example does not have any conflicts between the RRC and SFI configurations and hence should be regarded as DL but the DCI indicates that it is an UL, thereby causing ambiguity at the UE. It should be appreciated that although in this example UE specific DCI is used as the most dynamic configuration, other configurations more dynamic than those in RRC and SFI can also be used to overwrite conflicting symbol configurations. Such embodiments of the present technique therefore give flexibility to the gNB to change its mind on the structure of a symbol once it is RRC configured. In other words, the at least one other slot configuration information comprises second slot configuration information indicating the configuration of a second duration comprising one or more time slots of the first plurality of time slots, and third slot configuration information indicating the configuration of a third duration comprising one or more time slots of the first plurality of time slots, and wherein the determining the configuration of the differently configured one or more symbols by the communications device according to a conflict resolution rule comprises identifying the one or more symbols of each of the one or more time slots which are configured differently between the first slot configuration information, the second slot configuration information and the third slot configuration information, identifying a shortest of the first duration, the second duration and third duration, and if the duration of the configuration of the plurality of time slots by the first slot configuration information is the shortest then determining the configuration of the one or more time slots which are configured differently according to the first slot configuration information, or if the duration of the configuration of the one or more of the time slots by the second slot configuration information is the shortest then determining the configuration of the one or more time slots which are configured differently according to the second slot configuration information, or if the duration of the configuration of the one or more of the time slots by the third slot configuration information is the shortest then determining the configuration of the one or more time slots which are configured differently according to the third slot configuration information.

Here, and generally in embodiments of the present technique as disclosed and discussed herein, a "duration" of the of the slot configuration information means a length of time that the slot configuration information is valid, before the network or infrastructure equipment transmits new slot configuration information of the same method/format to supersede the old slot configuration information. For example, the duration of RRC slot configuration information may persist and be valid until it is over-written by a further RRC configuration and so its duration may be measured in a number of hours, while the duration of DCI slot configuration information may change per slot and therefore has a much shorter duration.

Figure 7:
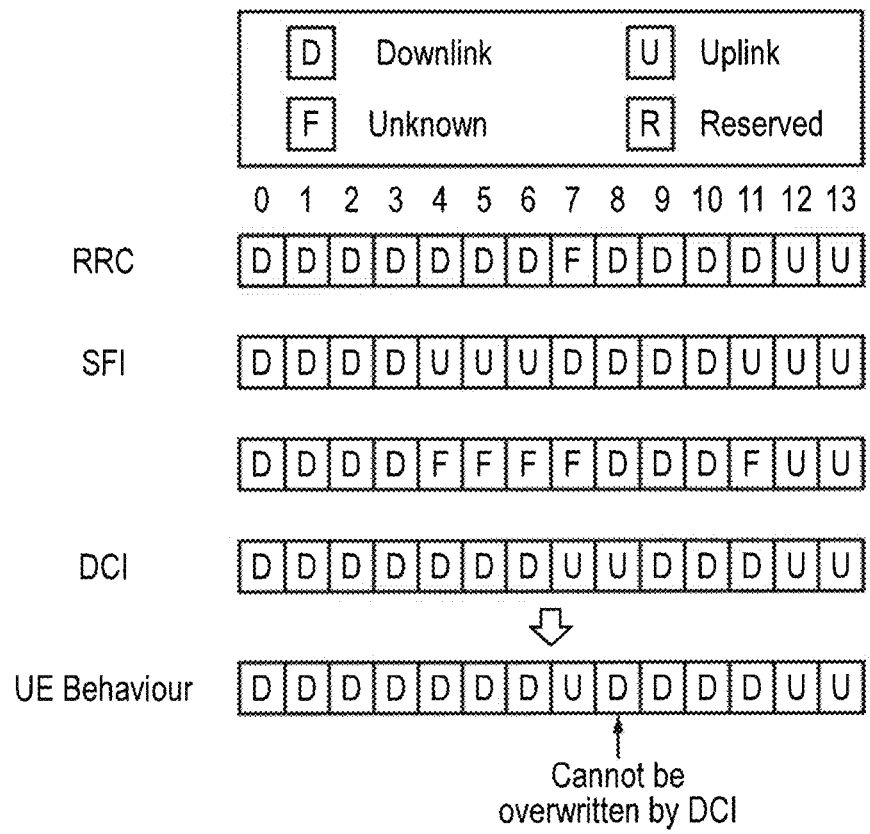
FIG. 7 illustrates an example of a second method of resolving a conflict between multiple methods used to configure a New Radio slot in accordance with embodiments of the present technique, in which non-conflicting symbols are not overwritten.

In some embodiments of the present technique, non-conflicting symbols between the RRC and SFI cannot be overwritten. That, is using the exemplary configurations shown in FIG. 6, symbol 8 shall be resolved as a DL symbol since the RRC and SFI indicates that it is a DL symbol, and per this embodiment it cannot be overwritten as shown in FIG. 7, even though the DCI indicates it as an UL symbol.

In some embodiments of the present technique, conflicting symbols shall remain as flexible until they are overwritten by a DCI. That is, in the absence of a UE specific DCI configuration, these conflicting symbols shall remain as "Unknown" i. e. without direction and therefore they are not used by the UE.

Figure 8:
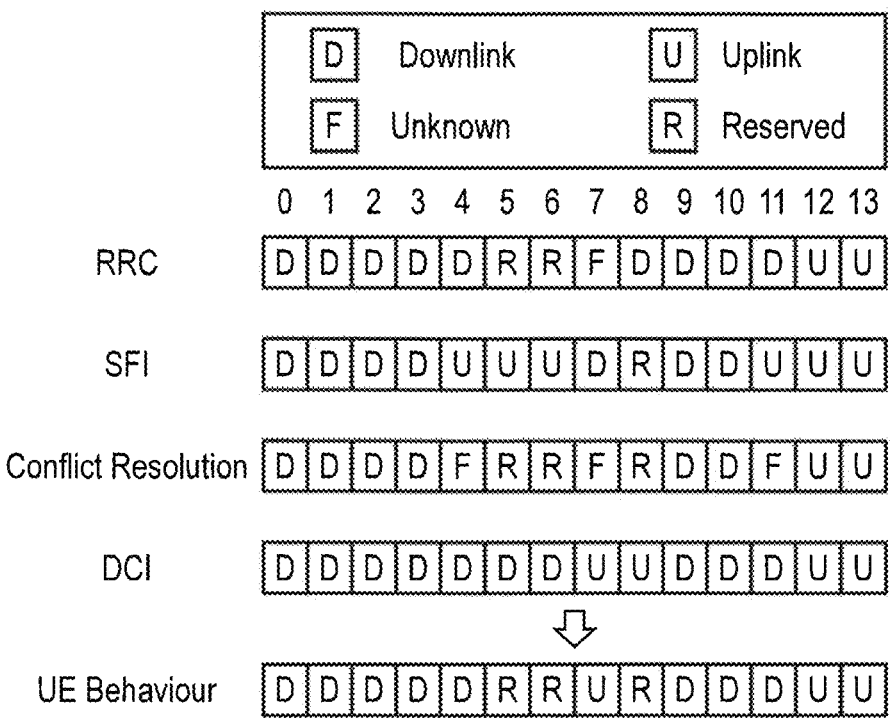
FIG. 8 illustrates an example of a third method of resolving a conflict between multiple methods used to configure a New Radio slot in accordance with embodiments of the present technique, including conflict resolution for "reserved" symbols.

In some embodiments of the present technique, if a "Reserved" symbol faces conflict then the symbol would remain as "Reserved". An example is shown in FIG. 8, where RRC configures symbols 5 and 6 as "Reserved" whilst SFI configures symbol 8 as "Reserved." Hence, symbols 5, 6 and 8 are always "Reserved" and cannot be overwritten by DCI. Other conflicting symbols such as symbols 4, 7 and 11 are resolved as flexible or "Unknown" symbols, which can be overwritten by the DCI. In other words, the determining the configuration of the differently configured one or more symbols by the communications device according to a conflict resolution rule comprises identifying the one or more symbols of each of the one or more time slots which are configured differently between the first slot configuration information and the at least one other slot configuration information, and if at least one of the first slot configuration information or the at least one other slot configuration information configures any of the one or more differently configured symbols as reserved, then determining that the configuration of the symbol is reserved.

Figure 9:
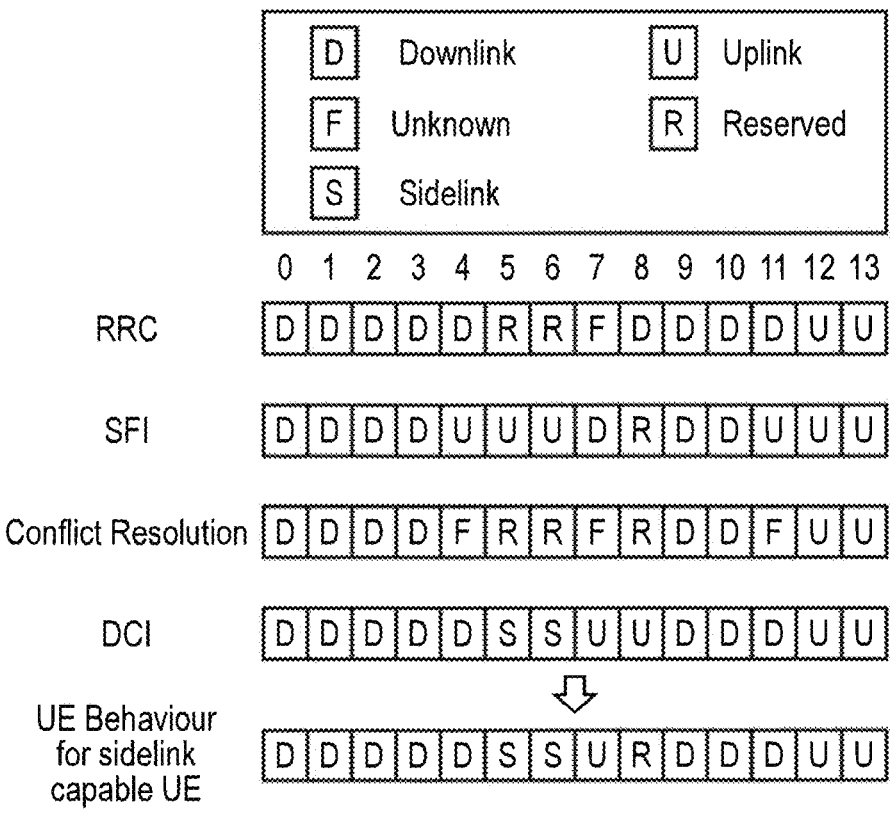
FIG. 9 illustrates an example of a first method of resolving a conflict between multiple methods used to configure a New Radio slot in accordance with embodiments of the present technique, including conflict resolution for "reserved" symbols and where a new slot format may be used.

In some embodiments of the present technique, for a later release UE which is capable for transmitting and/or receiving a new slot format, if the "Reserved" symbol faces conflict, then the symbol would be overwritten by the new slot format when UE-specific DCI indicates the new slot format. Furthermore, the symbol would remain as a "Reserved" symbol when UE-specific DCI does not indicate the new slot format, e.g. downlink, uplink, Unknown or Reserved. An example is shown in FIG. 9, where the symbols 5, 6 and 8 are assumed as "Reserved" symbols after the conflict resolution, similarly to the embodiments of the present technique exemplified by FIG. 8. In these embodiments, the UE-specific DCI indicates "Sidelink" symbols as the new slot format in the symbols 5 and 6, and Uplink symbol in the symbol 8. A sidelink capable UE assumes the symbols 5 and 6 as "Sidelink" symbols and the symbol 8 as "Reserved" symbol. Here, the sidelink capable UE is new Release UE, and the sidelink can be a transmission direction for transmitting and/or receiving Device-to-Device (D2D) data to or from another capable UE. In other words, the determining the configuration of the differently configured one or more symbols by the communications device according to a conflict resolution rule comprises identifying the one or more symbols of each of the one or more time slots which are determined through the conflict resolution rule to be reserved, receiving a further slot configuration information from the infrastructure equipment indicating the configuration of one or more of the time slots, and, if the further configuration information indicates that one or more of the symbols of each of the one or more time slots are configured with a new slot format, determining based on the further slot configuration, for each symbol of each of the one or more time slots which are determined through the conflict resolution rule to be reserved, that the configuration of each symbol which is determined through the conflict resolution rule to be reserved is the new slot format. The new slot format indicates that the communications device should transmit signals or receive signals on a device-to-device, D2D, sidelink to another communications device, wherein the new slot format is only indicated in slot configuration information transmitted from the infrastructure equipment to D2D-enabled communications devices.

As discussed herein, the first slot configuration information and the at least one other slot configuration information are each provided by one of radio resource control information, a slot format indicator communicated in a group communications channel and a downlink control information, wherein the duration of a slot configuration information provided by radio resource control information is greater than a duration of a slot configuration information provided by a slot format indicator, and the duration of a slot configuration information is greater than a duration of a slot configuration information provided by a downlink control information.

Figure 10:
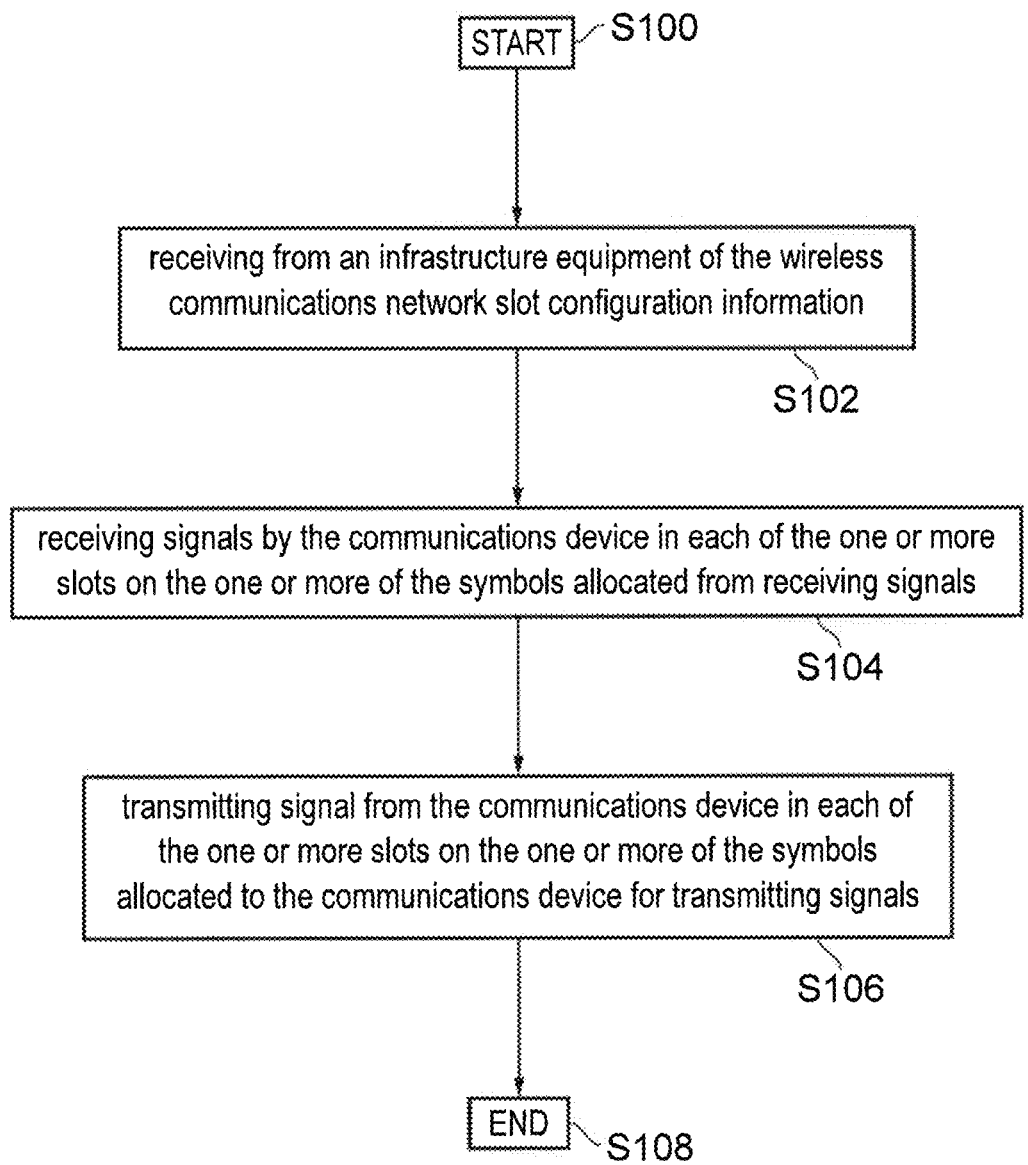
FIG. 10 shows a first flow diagram illustrating a process of communications in a communications system in accordance with embodiments of the present technique.

FIG. 10 shows a first flow diagram illustrating a method of communications in a communications system in accordance with embodiments of the present technique. The flow diagram of FIG. 10 corresponds to a portion of the part schematic, part message flow diagram representation of a communications system in accordance with embodiments of the present technique shown in FIG. 5. The method is a method of transmitting or receiving signals by a communications device communicating under control of a wireless communications network. The method starts in step S100. The method comprises in step S102, receiving from an infrastructure equipment of the wireless communications network slot configuration information indicating a configuration of one or more slots of a wireless access interface provided by the wireless communications network for communicating data to the communications device on a downlink and receiving data from the communications device on an uplink, the time divided slots of the wireless access interface each providing a plurality of symbols on one of more radio frequency carrier signals which can be configured differently for use by the communications device or the infrastructure equipment, the slot configuration information including an indication that one or more of the plurality of symbols are to be used for transmitting signals from the communications device or that one or more of the plurality of symbols are to be used for receiving signals at the communications device. In accordance with the received slot configuration information, in step S104, the process comprises receiving signals by the communications device in each of the one or more slots on the one or more of the symbols allocated for receiving signals and in step S106, the method comprises transmitting signals from the communications device in each of the one or more slots on the one or more of the symbols allocated to the communications device for transmitting signals. The process ends in step S108.

Figure 11:
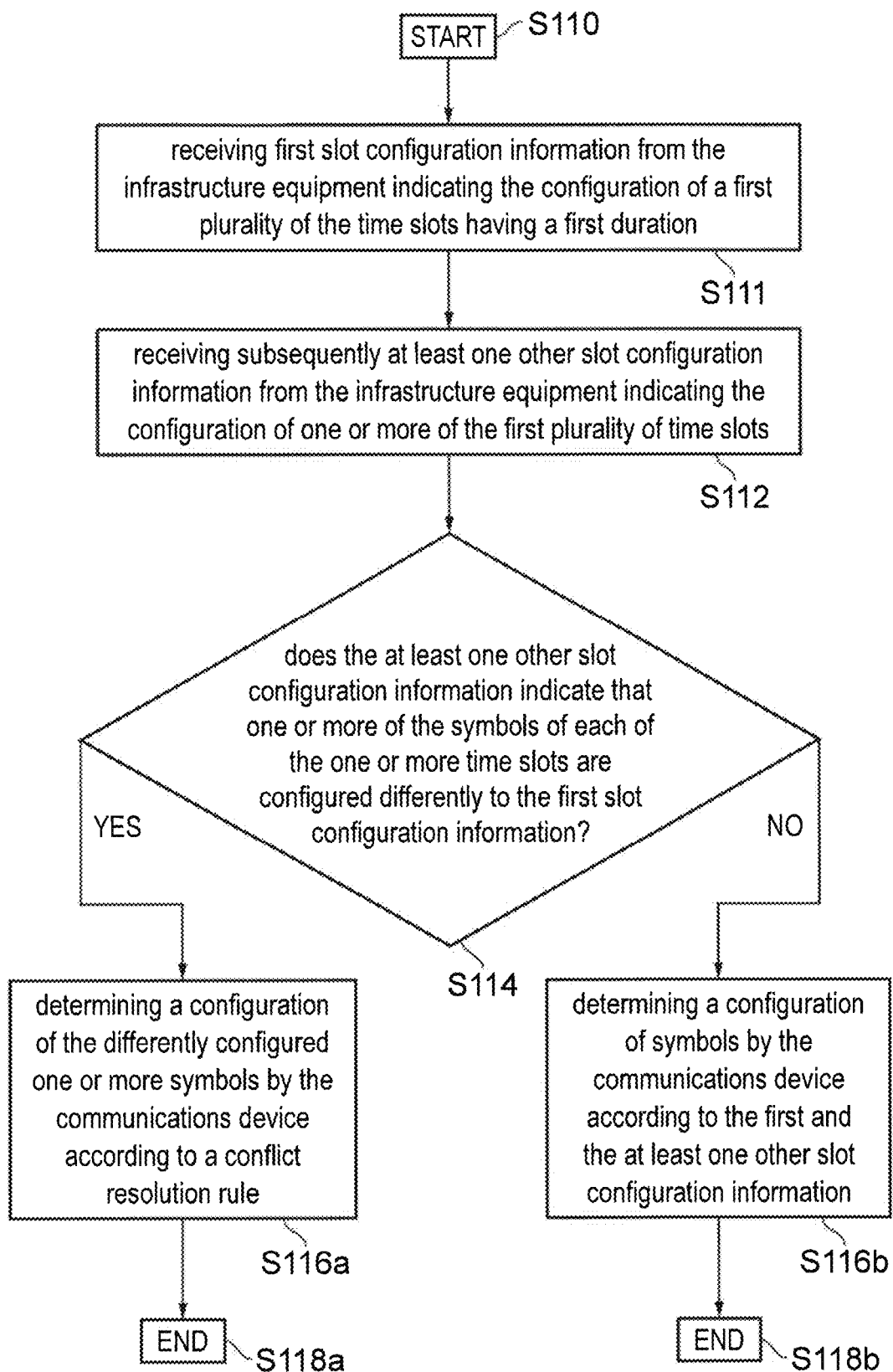
FIG. 11 shows a second flow diagram illustrating a process of communications in a communications system in accordance with embodiments of the present technique.

FIG. 11 shows a second flow diagram illustrating a method of communications in a communications system in accordance with embodiments of the present technique. The flow diagram of FIG. 11 corresponds to a portion of the part schematic, part message flow diagram representation of a communications system in accordance with embodiments of the present technique shown in FIG. 5, and furthermore takes place during step S102 of the method illustrated by the flow diagram of FIG. 10. The method starts in step S110. The method comprises in step S111, receiving first slot configuration information from the infrastructure equipment indicating the configuration of a first plurality of the time slots having a first duration. In step S112, the process receiving subsequently at least one other slot configuration information from the infrastructure equipment indicating the configuration of one or more of the first plurality of time slots. In step S114, the method comprises determining if the at least one other slot configuration information indicates that one or more of the symbols of each of the one or more time slots are configured differently to the first slot configuration information. Should the outcome of the determination of step S114 be "Yes" the method advances to step S116a, which comprises determining a configuration of the differently configured one or more symbols by the communications device according to a conflict resolution rule. However, if the outcome of the determination of step S114 be "No" the method advances to step S116b, which comprises determining a configuration of symbols by the communications device according to the first and the at least one other slot configuration information. The process ends in either step S118a or S118b.

Though the slot configuration information methods discussed in this document and in relation to embodiments of the present technique comprise RRC, SFI and DCI, those skilled in the art would appreciate that other configuration methods can also be used in embodiments of the present technique, or a subset of those discussed (RRC, SFI and DCI) may be used alone or in addition to other configuration methods not discussed herein.

As will be appreciated, an infrastructure equipment or eNB can be configured to apply the same determination to configure any of the symbols which are differently configured by different slot configuration information. That is to say, although the eNB is transmitting the first and the subsequent slot configuration information which may conflict with respect to the configuration of one or more symbols in one of more of the same time slots as a result, for example, of a difference in short and long term requirement, the eNB can apply the same conflict resolution rule and the same calculation for the dynamic characteristic to that applied by the UE and so can make the same determination of the configuration of the differently configured or conflicting symbols as would be applied by the communications device.

Embodiments of the present technique can therefore provide an infrastructure equipment for forming part of a wireless communications network. The infrastructure equipment may comprise transmitter circuitry configured to transmit signals to one or more wireless communications devices via a wireless access interface provided by the wireless communications network, receiver circuitry configured to receive signals from one or more of the communications devices transmitted via the wireless access interface, and controller circuitry for controlling the transmitter circuitry and the receiver circuitry to transmit the signals to the one or more communications devices and to receive signals from the one or more communications devices to communicate the data. The controller circuitry is configured with the transmitter circuitry and the receiver circuitry to transmit to at least one of the communications devices slot configuration information indicating a configuration of one or more time divided slots of a wireless access interface provided by the wireless communications network for transmitting the data to the communications device in a downlink and receiving the data from the communications device in an uplink, the time divided slots of the wireless access interface each providing a plurality of symbols on one of more radio frequency carrier signals which can be configured differently for use by the communications device or the infrastructure equipment, the slot configuration information including an indication that one or more of the plurality of symbols are to be used for transmitting signals from the communications device or that one or more of the plurality of symbols are to be used for receiving signals at the communications device, the transmitted slot configuration information comprising first slot configuration information indicating the configuration of a first plurality of the time slots, and at least one other slot configuration information indicating the configuration of one or more of the first plurality of time slots, wherein the controller circuitry is configured with the receiver circuity and the transmitter circuitry to determine, if the at least one other slot configuration information indicates that one or more of the symbols of each of the one or more time slots are configured differently to the first slot configuration information, a dynamic characteristic of the first slot information and the at least one other slot information known to be applied by the communications device, to determine a configuration of the differently configured one or more symbols as a determination which would be made by the communications device according to a conflict resolution rule based on the determined dynamic characteristic of the first slot configuration information and the determined dynamic characteristic of the at least one other slot configuration information, to transmit the signals in each of the one or more time slots on the one or more of the symbols allocated from transmitting signals to the communications device, and to receive the signals from the communications device in each of the one or more time slots on the one or more of the symbols allocated for receiving signals from the communications device.

The following numbered paragraphs provide further example aspects and features of the present technique:

Paragraph 1. A method of transmitting or receiving signals by a communications device communicating under control of a wireless communications network, the method comprising receiving from an infrastructure equipment of the wireless communications network slot configuration information indicating a configuration of one or more time divided slots of a wireless access interface provided by the wireless communications network for communicating data to the communications device in a downlink and receiving data from the communications device in an uplink, the time divided slots of the wireless access interface each providing a plurality of symbols on one of more radio frequency carrier signals which can be configured differently for use by the communications device or the infrastructure equipment, the slot configuration information including an indication that one or more of the plurality of symbols are to be used for transmitting signals from the communications device or that one or more of the plurality of symbols are to be used for receiving signals at the communications device, and in accordance with the received slot configuration information receiving signals by the communications device in each of the one or more time slots on the one or more of the symbols allocated from receiving signals, and transmitting signals from the communications device in each of the one or more time slots on the one or more of the symbols allocated to the communications device for transmitting signals, wherein the receiving the slot configuration information from the infrastructure equipment comprises receiving first slot configuration information from the infrastructure equipment indicating the configuration of a first plurality of the time slots, and receiving, subsequently, at least one other slot configuration information from the infrastructure equipment indicating the configuration of one or more of the first plurality of time slots, and if the at least one other slot configuration information indicates that one or more of the symbols of each of the one or more time slots are configured differently to the first slot configuration information, determining a dynamic characteristic of the first slot information and the at least one other slot information, and determining a configuration of the differently configured one or more symbols by the communications device according to a conflict resolution rule based on the determined dynamic characteristic of the first slot configuration information and the determined dynamic characteristic of the at least one other slot configuration information.

Paragraph 2. A method according to paragraph 1, wherein the dynamic characteristic is a representation indicating a rate of change of the first slot configuration information and the at least one other slot configuration information, and the determining the configuration of the differently configured one or more symbols by the communications device according to the conflict resolution rule comprises identifying the one or more symbols of each of the one or more time slots which are configured differently between the first slot configuration information and the at least one other slot configuration information, and if the determined rate of change of the configuration of the plurality of time slots by the first slot configuration information is greater than the determined rate of change of the at least one other slot configuration information, determining the configuration of the one or more symbols according to the at least one other slot configuration information in preference to the first slot configuration information, else determining the configuration of the one or more symbols according to the first slot configuration information in preference to the at least one other slot configuration information.

Paragraph 3. A method according to paragraph 1, wherein the at least one other slot configuration information comprises second slot configuration information indicating the configuration of one or more time slots of the first plurality of time slots, and third slot configuration information indicating the configuration of the one or more time slots of the first plurality of time slots, the determining the dynamic characteristic of the first slot information and the at least one other slot information, comprises determining a representation of a rate of change of the first slot configuration information, the second slot configuration information and the third slot configuration information, and the determining the configuration of the differently configured one or more symbols by the communications device according to the conflict resolution rule comprises identifying the one or more symbols of each of the one or more time slots which are configured differently between the first slot configuration information, the second slot configuration information and the third slot configuration information, identifying which of the first, second or third slot information has the greatest rate of change, and determining the configuration of the one or more symbols according to the first, second or third slot configuration information which has the greatest rate of change in preference to the others of the first, second or third slot configuration information.

Paragraph 4. A method according to paragraph 1, 2 or 3, wherein the determining the configuration of the differently configured one or more symbols by the communications device according to a conflict resolution rule comprises identifying whether any of the differently configured one or more symbols are configured as reserved in the first slot configuration information and the at least one other slot configuration information, and if at least one of the first slot configuration information or the at least one other slot configuration information configures any of the one or more differently configured symbols as reserved, then determining that the configuration of the symbol is reserved.

Paragraph 5. A method according to paragraph 4, wherein the determining the configuration of the differently configured one or more symbols by the communications device according to a conflict resolution rule comprises receiving a further slot configuration information from the infrastructure equipment indicating the configuration of one or more of the time slots, and, if the further configuration information indicates that one or more of the symbols of each of the one or more time slots are configured with a new slot format, determining based on the further slot configuration that one or more of the differently configured symbols should be configured according to the new slot format.

Paragraph 6. A method according to paragraph 4, wherein the determining the configuration of the differently configured one or more symbols by the communications device according to a conflict resolution rule comprises identifying the one or more symbols of each of the one or more time slots which are determined through the conflict resolution rule to be reserved, receiving a further slot configuration information from the infrastructure equipment indicating the configuration of one or more of the time slots, and, if the further configuration information indicates that one or more of the symbols of each of the one or more time slots are configured with a new slot format, determining based on the further slot configuration, for each symbol of each of the one or more time slots which are determined through the conflict resolution rule to be reserved, that the configuration of each symbol which is determined through the conflict resolution rule to be reserved is the new slot format.

Paragraph 7. A method according to paragraph 5 or 6, wherein the new slot format indicates that the communications device should transmit signals or receive signals on a device-to-device, D2D, sidelink to another communications device, wherein the new slot format is only indicated in slot configuration information transmitted from the infrastructure equipment to D2D-enabled communications devices.

Paragraph 8. A method according to any of paragraphs 1 to 7, wherein the first slot configuration information and the at least one other slot configuration information are each provided by one of radio resource control information, a slot format indicator communicated in a group communications channel and a downlink control information.

Paragraph 9. A method according to any of paragraphs 2 to 7, wherein the first slot configuration information and the at least one other slot configuration information are each provided by one of radio resource control information, a slot format indicator communicated in a group communications channel and a downlink control information and the rate of change of the slot configuration information provided by radio resource control information is slower than the rate of change of the slot configuration information provided by a slot format indicator, and the rate of change of the slot configuration information is greater than the rate of change of the slot configuration information provided by the downlink control information.

Paragraph 10. A method according to paragraph 9, wherein the determining the configuration of the differently configured one or more symbols by the communications device according to a conflict resolution rule comprises
determining that the configuration of symbols which are configured the same by each of the radio resource control information and the slot format indicator and which are configured differently by the downlink control information should be the same as the configuration of the symbols by the radio resource control information and the slot format indicator.

Paragraph 11. A method according to paragraph 10, wherein the determining the configuration of the differently configured one or more symbols by the communications device according to a conflict resolution rule comprises
determining that the configuration of symbols which are configured differently by the radio resource control information and the slot format indicator should be a flexible configuration.

Paragraph 12. A method according to paragraph 11, wherein the determining the configuration of the differently configured one or more symbols by the communications device according to a conflict resolution rule comprises
determining that the configuration of symbols which have a flexible configuration should be the same as the configuration of the symbols by the downlink control information.

Paragraph 13. A method according to any of paragraphs 10 to 12, wherein the determining the configuration of the differently configured one or more symbols by the communications device according to a conflict resolution rule comprises
identifying the one or more symbols of each of the one or more time slots which are configured differently between the radio resource control information and the slot format indicator, and if at least one of the radio resource control information and the slot format indicator configures any of the one or more differently configured symbols as reserved, then determining that the configuration of the symbol is reserved.

Paragraph 14. A method according to paragraph 13, wherein the determining the configuration of the differently configured one or more symbols by the communications device according to a conflict resolution rule comprises
identifying the one or more symbols of each of the one or more time slots which are determined through the conflict resolution rule to be reserved,
receiving a downlink control information from the infrastructure equipment indicating the configuration of one or more of the time slots, and, if the downlink control information indicates that one or more of the symbols of each of the one or more time slots are configured with a new slot format,
determining based on the downlink control information, for each symbol of each of the one or more time slots which are determined through the conflict resolution rule to be reserved, that the configuration of each symbol which is determined through the conflict resolution rule to be reserved is the new slot format.

Paragraph 15. A method according to paragraph 14, wherein the new slot format indicates that the communications device should transmit signals or receive signals on a device-to-device, D2D, sidelink to another communications device, wherein the new slot format is only indicated in downlink control information transmitted from the infrastructure equipment to D2D-enabled communications devices.

Paragraph 16. A communications device for transmitting or receiving signals for communicating data under control of a wireless communications network, the communications device comprising
transmitter circuitry configured to transmit signals to an infrastructure equipment of the wireless communications network via a wireless access interface provided by the wireless communications network,
receiver circuitry configured to receive signals from the infrastructure equipment transmitted via the wireless access interface, and
controller circuitry for controlling the transmitter circuitry and the receiver circuitry to transmit the signals to the infrastructure equipment and to receive signals from the infrastructure equipment to communicate the data, the controller circuitry being configured with the transmitter circuitry and the receiver circuitry
to receive from the infrastructure equipment slot configuration information indicating a configuration of one or more time divided slots of a wireless access interface provided by the wireless communications network for transmitting the data to the communications device in a downlink and receiving the data from the communications device in an uplink, the time divided slots of the wireless access interface each providing a plurality of symbols on one of more radio frequency carrier signals which can be configured differently for use by the communications device or the infrastructure equipment, the slot configuration information including an indication that one or more of the plurality of symbols are to be used for transmitting signals from the communications device or that one or more of the plurality of symbols are to be used for receiving signals at the communications device, the received slot configuration information comprising first slot configuration information indicating the configuration of a first plurality of the time slots, and at least one other slot configuration information indicating the configuration of one or more of the first plurality of time slots, wherein the controller circuitry is configured with the receiver circuity and the transmitter circuitry to determine, if the at least one other slot configuration information indicates that one or more of the symbols of each of the one or more time slots are configured differently to the first slot configuration information, a dynamic characteristic of the first slot information and the at least one other slot information, and to determine a configuration of the differently configured one or more symbols according to a conflict resolution rule based on the determined dynamic characteristic of the first slot configuration information and the determined dynamic characteristic of the at least one other slot configuration information, to receive the signals in each of the one or more time slots on the one or more of the symbols allocated from receiving signals, and to transmit the signals from the communications device in each of the one or more time slots on the one or more of the symbols allocated to the communications device for transmitting signals.

Paragraph 17. A method of transmitting signals to a wireless communications device from an infrastructure equipment of a wireless communications network or receiving signals from the communications device by the infrastructure equipment, the method comprising transmitting from the infrastructure equipment to the communications device slot configuration information indicating a configuration of one or more time divided slots of a wireless access interface provided by the wireless communications network for communicating data to the communications device in a downlink and receiving data from the communications device in an uplink, the time divided slots of the wireless access interface each providing a plurality of symbols on one of more radio frequency carrier signals which can be configured differently for use by the communications device or the infrastructure equipment, the slot configuration information including an indication that one or more of the plurality of symbols are to be used for transmitting signals from the infrastructure equipment or that one or more of the plurality of symbols are to be used for receiving signals from the communications device, and in accordance with the received slot configuration information transmitting signals to the communications device in each of the one or more time slots on the one or more of the symbols allocated from receiving signals, and receiving signals from the communications device in each of the one or more time slots on the one or more of the symbols allocated to the communications device for transmitting signals, wherein the transmitting the slot configuration information from the infrastructure equipment comprises transmitting first slot configuration information from the infrastructure equipment indicating the configuration of a first plurality of the time slots, and transmitting, subsequently, at least one other slot configuration information from the infrastructure equipment indicating the configuration of one or more of the first plurality of time slots, and if the at least one other slot configuration information indicates that one or more of the symbols of each of the one or more time slots are configured differently to the first slot configuration information, determining a dynamic characteristic of the first slot information and the at least one other slot information in accordance with a determination known to be applied by the communications device, and determining a configuration of the differently configured one or more symbols as a determination would be made by the communications device according to a conflict resolution rule based on the determined dynamic characteristic of the first slot configuration information and the determined dynamic characteristic of the at least one other slot configuration information.

Paragraph 18. An infrastructure equipment for forming part of a wireless communications network, the infrastructure equipment comprising transmitter circuitry configured to transmit signals to one or more wireless communications devices via a wireless access interface provided by the wireless communications network, receiver circuitry configured to receive signals from one or more of the communications devices transmitted via the wireless access interface, and controller circuitry for controlling the transmitter circuitry and the receiver circuitry to transmit the signals to the one or more communications devices and to receive signals from the one or more communications devices to communicate the data, the controller circuitry being configured with the transmitter circuitry and the receiver circuitry to transmit to at least one of the communications devices slot configuration information indicating a configuration of one or more time divided slots of a wireless access interface provided by the wireless communications network for transmitting the data to the communications device in a downlink and receiving the data from the communications device in an uplink, the time divided slots of the wireless access interface each providing a plurality of symbols on one of more radio frequency carrier signals which can be configured differently for use by the communications device or the infrastructure equipment, the slot configuration information including an indication that one or more of the plurality of symbols are to be used for transmitting signals from the communications device or that one or more of the plurality of symbols are to be used for receiving signals at the communications device, the transmitted slot configuration information comprising first slot configuration information indicating the configuration of a first plurality of the time slots, and at least one other slot configuration information indicating the configuration of one or more of the first plurality of time slots, wherein the controller circuitry is configured with the receiver circuity and the transmitter circuitry to determine, if the at least one other slot configuration information indicates that one or more of the symbols of each of the one or more time slots are configured differently to the first slot configuration information, a dynamic characteristic of the first slot information and the at least one other slot information known to be applied by the communications device, to determine a configuration of the differently configured one or more symbols as a determination which would be made by the communications device according to a conflict resolution rule based on the determined dynamic characteristic of the first slot configuration information and the determined dynamic characteristic of the at least one other slot configuration information, to transmit the signals in each of the one or more time slots on the one or more of the symbols allocated from transmitting signals to the communications device, and to receive the signals from the communications device in each of the one or more time slots on the one or more of the symbols allocated for receiving signals from the communications device.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] R1-1714064, "On the UE behaviour related to group-common PDCCH in NR" Nokia, Nokia Shanghai Bell, RAN1 #90.
[6] Holma H. and Toskala A, "LTE for UMTS OFDMA and SC-FDMA based radio access", John Wiley and Sons, 2009.
[7] 3GPP TS 36.304 version 14.2.0 Release 14.
[8] 3GPP TS 36.321 version 13.5.0 Release 13.
[9] RP-160671, "New SID Proposal: Study on New Radio Access Technology," NTT DOCOMO, RAN #71.
[10] RP-170847, "New WID on New Radio Access Technology," NTT DOCOMO, INC., RAN #75.

What is claimed is:

1. A User Equipment (UE), comprising:
radio communication circuitry; and
processing circuitry configured to:
receive, from an infrastructure equipment via the radio communication circuitry, first slot configuration information and at least one other slot configuration information, each of the first and the at least one other slot configuration information indicating:
a configuration of one or more slots for at least one of a downlink, an uplink, or a flexible, each of the one or more slots comprising one or more symbols, or
a configuration of one or more of plurality of symbols used for at least one of the downlink, the uplink or the flexible; and
in accordance with at least one of the received first and the received at least one other slot configuration information, receive signals from an infrastructure equipment or transmit signals to the infrastructure equipment, wherein
the first slot configuration information is UE specific Downlink Control Information (DCI) and the at least one slot configuration information is one or more of Radio Resource Control (RRC) configuration information and Slot Format Indicator (SFI) carried by Group Common Physical Downlink Control Channel (PDCCH), and
if one symbol has no conflicts between the RRC configuration information and the SFI carried by the Group Common PDCCH and is indicated as downlink, and if the one symbol is indicated as uplink by the UE specific DCI, then the one symbol which was indicated as uplink by the UE specific DCI is regarded as downlink.

2. The UE according to the claim 1, wherein the flexible symbol configured by the at least one slot configuration is overwritten by the UE specific DCI.

3. The UE according to claim 1, wherein the one symbol is indicated by the RRC confirmation information.

4. The UE according to claim 1, wherein the one symbol is indicated by the SFI.

5. The UE according to claim 1, wherein the one symbol is always indicated by the RRC confirmation information or the SFI.

6. The UE according to claim 1, wherein there is no overlapping symbol between the RRC confirmation information and the SFI.

7. The UE according to claim 1, wherein
if another symbol is configured as reserved by at least one of the RRC configuration information or the SFI, the processing circuitry is configured to regard the another symbol as reserved, and
the reserved configuration is not overwritten by the UE specific DCI.

8. The UE according to claim 7, wherein the reserved another symbol is overwritten by the UE specific DCI only if the UE specific DCI indicates a sidelink slot format for device-to-device communication.

9. An infrastructure equipment, comprising:
radio communication circuitry; and
processing circuitry configured to
provide, to a User Equipment (UE) via the radio communication circuitry, first slot configuration information and at least one other slot configuration information, each of the first and the at least one other slot configuration information indicating:
a configuration of one or more slots for at least one of a downlink, an uplink, or a flexible, each of the one or more slots comprising one or more symbols, or
a configuration of one or more of plurality of symbols used for at least one of the downlink, the uplink or the flexible; and
in accordance with at least one of the provided first and the provided at least one other slot configuration information, transmit signals to the UE or receive signals from the UE, wherein
the first slot configuration information is UE specific Downlink Control Information (DCI) and the at least one slot configuration information is one or more of Radio Resource Control (RRC) configuration information and Slot Format Indicator (SFI) carried by Group Common Physical Downlink Control Channel (PDCCH), and
if one symbol has no conflicts between the RRC configuration information and the SFI carried by the Group Common PDCCH and is indicated as downlink, and if the one symbol is indicated as uplink by the UE specific DCI, then the one symbol which was indicated as uplink by the UE specific DCI is regarded as downlink.

10. The infrastructure equipment according to the claim 9, wherein the flexible symbol configured by the at least one slot configuration is overwritten by the UE specific DCI.

11. A method performed by a User Equipment (UE), the method comprising:
receiving, from an infrastructure equipment, first slot configuration information and at least one other slot configuration information, each of the first and the at least one other slot configuration information indicating:
a configuration of one or more slots for at least one of a downlink, an uplink, or a flexible, each of the one or more slots comprising one or more symbols, or
a configuration of one or more of plurality of symbols used for at least one of the downlink, the uplink or the flexible; and
in accordance with at least one of the received first and the received at least one other slot configuration information, receiving signals from an infrastructure equipment or transmitting signals to the infrastructure equipment, wherein
the first slot configuration information is UE specific Downlink Control Information (DCI) and the at least one slot configuration information is one or more of Radio Resource Control (RRC) configuration information and Slot Format Indicator (SFI) carried by Group Common Physical Downlink Control Channel (PDCCH), and
if one symbol has no conflicts between the RRC configuration information and the SFI carried by Group Common PDCCH and is indicated as downlink, and if the one symbol is indicated as uplink by the UE specific DCI, then the one symbol which was indicated as uplink by the UE specific DCI is regarded as downlink.

12. The method according to the claim 11, wherein the flexible symbol configured by the at least one slot configuration is overwritten by the UE specific DCI.

13. The method according to claim 11, wherein the one symbol is indicated by the RRC confirmation information.

14. The method according to claim 11, wherein the one symbol is indicated by the SFI.

15. The method according to claim 11, wherein the one symbol is always indicated by the RRC confirmation information or the SFI.

16. The method according to claim 11, wherein there is no overlapping symbol between the RRC confirmation information and the SFI.

17. The method according to claim 11, wherein
if another symbol is configured as reserved by at least one of the RRC configuration information or the SFI, the processing circuitry is configured to regard the another symbol as reserved, and
the reserved configuration is not overwritten by the UE specific DCI.

18. The method according to claim 17, wherein the reserved another symbol is overwritten by the UE specific DCI only if the UE specific DCI indicates a sidelink slot format for device-to-device communication.

19. A method performed by an infrastructure equipment, the method comprising:
providing, to a User Equipment (UE), first slot configuration information and at least one other slot configuration information, each of the first and the at least one other slot configuration information indicating:
a configuration of one or more slots for at least one of a downlink, an uplink, or a flexible, each of the one or more slots comprising one or more symbols, or
a configuration of one or more of plurality of symbols used for at least one of the downlink, the uplink or the flexible; and
in accordance with at least one of the provided first and the provided at least one other slot configuration information, transmitting signals to the UE or receiving signals from the UE, wherein
the first slot configuration information is UE specific Downlink Control Information (DCI) and the at least one slot configuration information is one or more of Radio Resource Control (RRC) configuration information and Slot Format Indicator (SFI) carried by Group Common Physical Downlink Control Channel (PDCCH), and
if one symbol has no conflicts between the RRC configuration information and the SFI carried by Group Common PDCCH and is indicated as downlink, and if the one symbol is indicated as uplink by the UE specific DCI, then the one symbol which was indicated as uplink by the UE specific DCI is regarded as downlink.

20. The infrastructure equipment according to the claim 19, wherein the flexible symbol configured by the at least one slot configuration is overwritten by the UE specific DCI.

* * * * *